J. W. OWEN.
MIXER FOR DOUGH AND LIKE PLASTIC SUBSTANCES.
APPLICATION FILED DEC. 16, 1920.
1,374,765.
Patented Apr. 12, 1921.
2 SHEETS—SHEET 1.
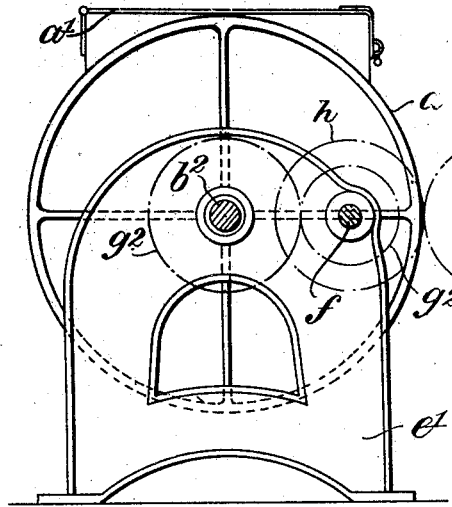
FIG. 1.
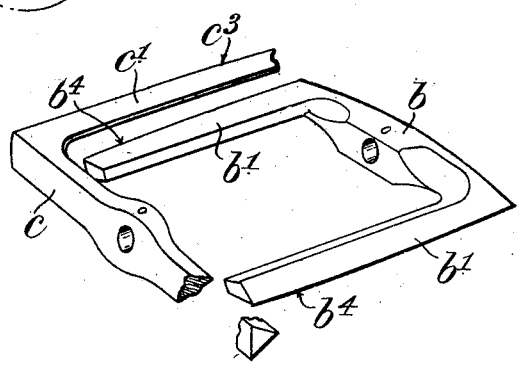
FIG. 6.
FIG. 2. FIG. 3.
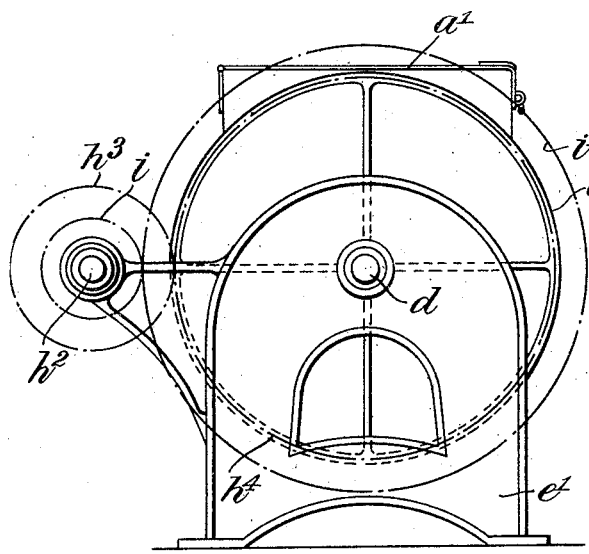
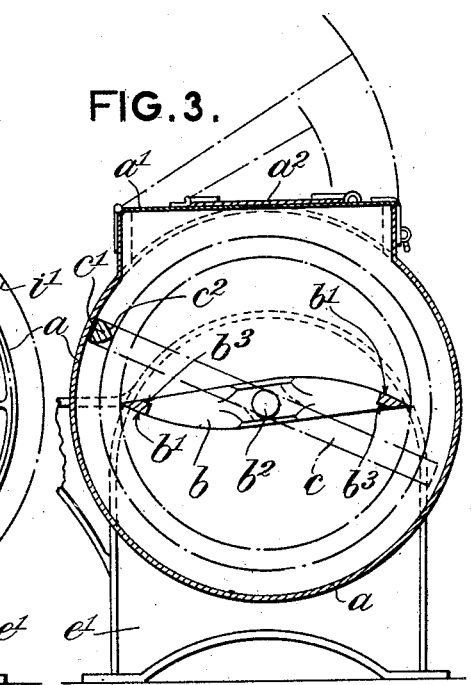
Inventor.
Joseph William Owen.
Attorney:

J. W. OWEN.
MIXER FOR DOUGH AND LIKE PLASTIC SUBSTANCES.
APPLICATION FILED DEC. 16, 1920.
1,374,765.
Patented Apr. 12, 1921.
2 SHEETS—SHEET 2.
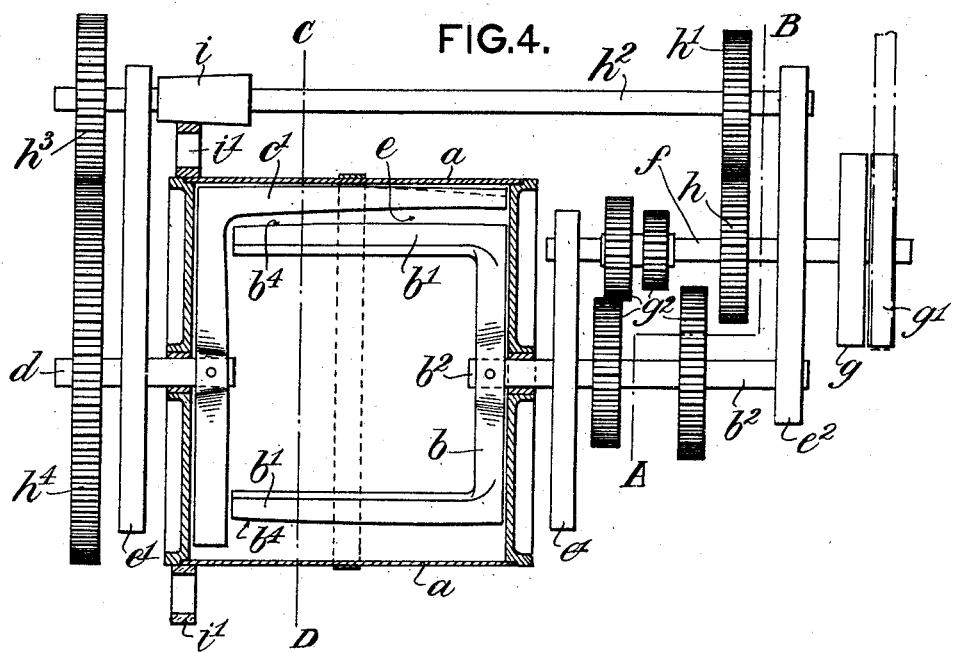
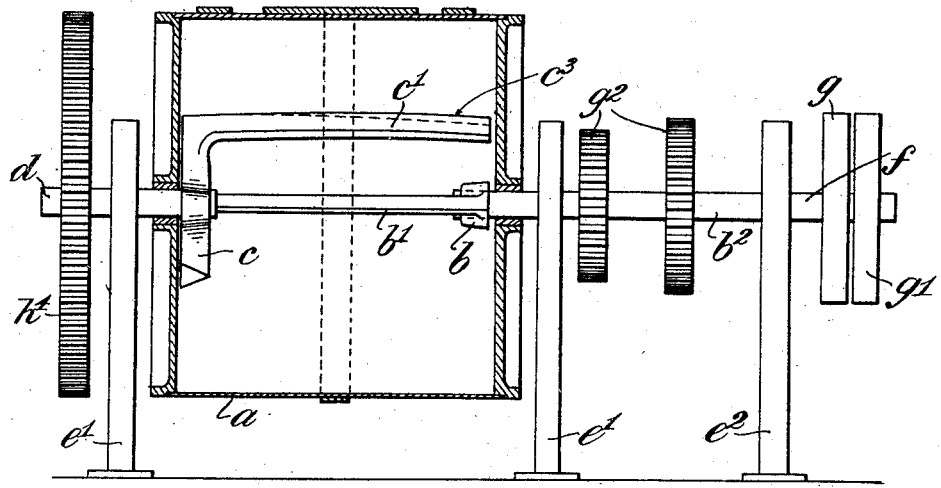
Inventor:
Joseph William Owen
Attorney:

UNITED STATES PATENT OFFICE.

JOSEPH WILLIAM OWEN, OF PLYMOUTH, ENGLAND.

MIXER FOR DOUGH AND LIKE PLASTIC SUBSTANCES.

1,374,765. Specification of Letters Patent. Patented Apr. 12, 1921.

Application filed December 16, 1920. Serial No. 431,219.

*To all whom it may concern:*

Be it known that I, JOSEPH WILLIAM OWEN, of Plymouth, in the county of Devon, England, bakery and confectionery expert, a subject of the King of Great Britain and Ireland, have invented certain new and useful Improvements in Mixers for Dough and like Plastic Substances, of which the following is a specification.

This invention relates to apparatus for mixing or kneading plastic substances, particularly dough, where it is desired to efficiently mix, stretch and knead the substance (hereinafter termed dough) in as short a time as possible without tearing or breaking the structure thereof.

Broadly stated, the invention comprises two mixing members capable of relative rotation, the outer one of said members having an arm or arms adapted to lie close to the inner wall of the mixing chamber or trough and the other or inner member having a plurality of spaced arms adapted to rotate in a path lying within and close to said outer arm or arms.

The invention further comprises details of construction and arrangements of parts all as hereinafter fully described and specifically pointed out in appended claims.

In the accompanying drawings:—

Figure 1 is an end view of the apparatus with parts in section on line A—B of Fig. 4.

Fig. 2 is a similar view from the opposite end;

Fig. 3 is a cross section on the line C—D of Fig. 4;

Fig. 4 is a plan view with parts in section and

Fig. 5 is a longitudinal central section through the chamber, with associated parts in elevation.

Fig. 6 is a perspective view of the stirrers.

As shown in the drawings there is provided a trough or chamber $a$ of any suitable capacity and suitably of circular cross-section, as shown, and within said chamber is mounted, for independent rotation, mixing arms or members of peculiar form and having special coöperative functions as follows:

One of said mixing members which may be termed the outer one, comprises a vertical arm $c$ mounted for rotation in an end wall of the trough or chamber $a$ as by means of a shaft $d$ extending through said end wall and at one end (or both ends if desired) of said vertical arm is a horizontal arm $c^1$ which will lie close to the inner wall of the trough and perform a scraping action to remove any dough which may accumulate thereon. The cross-section of said arm or arms $c^1$ is by preference triangular, as shown at $c^2$, with the apex inward to provide scraping edges for the purpose stated and yet offer not too great a resistance to the passage of the dough between itself and the arms of the inner mixing member to be described later. The outer surface of said horizontal arm or arms is also by preference slightly curved toward its free end as shown at $c^3$ (Figs. 5 and 6) in order not to exert too severe a scraping action such as would tear or break the dough and yet will evenly and smoothly remove it from the wall or walls of the chamber $a$.

The inner kneading or mixing member is somewhat similarly formed to the outer member, but in addition to the vertical arm $b$, comprises two horizontal arms $b^1$. It is mounted for rotation within the chamber $a$ in a similar manner to the outer member $c$ $c^1$, being carried by a shaft $b^2$ extending through the opposite end wall of the chamber $a$ and its arms $b^1$ are arranged to lie within or interiorly of the arm or arms $c^1$ of the outer member, so that during its rotation a small space $e$ is left between the outer edges of its arms and the inner edges of the arm or arms $c^1$ of said outer scraping member. This inner member is rotated at a considerably faster speed than the outer member, for example three times as fast, and during this movement the dough or other plastic substance is mixed, kneaded and stretched by said two arms $b^1$, this action being assisted by the coöperation of the arms of the inner and outer members until, at the conclusion of the operation, substantially the entire mass of dough becomes wound about or across the two arms $b^1$ of the inner mixer and the operation is complete.

In order to reduce resistance to the rotation of the arms in the mixing or kneading operation, the cross-section of the arms $b^1$ of the inner member is by preference double-triangular as shown at $b^3$, Fig. 3 or of irregular diamond shape, with adjacent bases or remote apices; this cross-section is not, however, essentially symmetrical but provides a broader inclined blade or active surface $b^3$ on that side which directly acts on the dough, in order to reduce as much as possible the resistance of the dough to the action of the arms and to avoid tearing or breaking the structure of the dough. The outer edges of the arms $b^1$ are also slightly curved as at $b^4$.

During the mixing or kneading operation, it is not essential that the outer mixing member $c$, $c^1$, should rotate, but it may remain stationary while the inner member $b$, $b^1$ rotates, the outer member only being rotated for removing surplus dough from the walls of the chamber $a$. This method is optional according to the character or quality of the dough under treatment, but in any case, whether stationary or rotating, the inner member rotates in relation to the outer one, and as aforesaid the arms of the inner member, assisted by the coöperation of the outer member, produces the desired action on the dough.

The actual construction of the trough and method of rotating the mixing members is not of material importance but there is shown in the drawings a practical embodiment very suitable for use in the case of a dough mixing plant.

As shown, the trough or chamber $a$ is itself mounted for rotation about the shafts $d$ and $b^2$ of the mixing members, these shafts being carried by end frame members $e^1$, another frame member $e^2$ being provided for supporting a counter-shaft $f$ and the outer end of shaft $b^2$.

The counter-shaft carries fast and loose pulleys $g$, $g^1$, from the former of which motion is imparted through change speed gear $g^2$ to the shaft $b^2$ of the inner mixing chamber. From shaft $f$ also motion is transmitted through gears $h$ $h^1$ to a lateral shaft $h^2$ and thence through other gears $h^3$ $h^4$ to the shaft $d$ of the outer mixing member and in addition from said shaft $h^2$ the chamber $a$ can be rotated by means of a cone $i$ which engages a friction ring $i^1$ surrounding the chamber $a$.

The upper part of the chamber $a$ (when in normal position) is provided with a hinged charging cover $a^1$ which in turn may be provided with a smaller hinged lid $a^2$ for use in inspecting the dough during treatment.

What I claim as my invention and desire to secure by Letters Patent of the United States is:—

1. In an apparatus for mixing plastic substances, the combination with a mixing chamber, of two coöperating mixing members therein, one of said members having a longitudinally extending arm adapted to lie close to the inner wall of said chamber and a triangular cross section with the apex of the triangle directed inwardly of the chamber, and the other member having a plurality of longitudinally extending spaced arms adapted to rotate in a path lying within and close to the arm of the first mentioned member, and means for relatively rotating said mixing members.

2. In an apparatus for mixing plastic substances, the combination with a mixing chamber, of two coöperating mixing members therein, one of said members having a longitudinally extending arm adapted to lie close to the inner wall of said chamber, and the other member having a plurality of spaced longitudinally extending arms adapted to rotate relatively to and in a path lying within and close to the arm of the first mentioned member, the cross section of said spaced arms being substantially double triangular with a wider inclined surface on that side which directly acts on the substance under treatment.

3. In an apparatus for mixing plastic substances, the combination with a mixing chamber, of two coöperating mixing members therein, one of said members having a longitudinally extending arm adapted to lie close to the inner wall of said chamber and a triangular cross section with the apex of the triangle directed inwardly of the chamber, and the other mixing member having a plurality of spaced longitudinally extending arms adapted to rotate relatively to and in a path lying within and close to the arm of the first mentioned member, the cross section of said spaced arms being double triangular with a wider inclined surface on that side which directly acts on the substance under treatment, and means for relatively rotating said mixing members.

4. In an apparatus for mixing plastic substances, the combination with a mixing chamber, of two coöperating mixing members therein, one of said members having a longitudinally extending arm adapted to lie close to the inner wall of said chamber, and the other member having a plurality of spaced longitudinally extending arms adapted to rotate in a path lying within and close to the arm of the first mentioned member, the outer free edge of one of said mixing arms curving inwardly at one end thereof.

5. In an apparatus for mixing plastic substances, the combination with a mixing chamber, of two coöperating mixing members therein; one of said members having a longitudinally extending arm adapted to lie close to the inner wall of said chamber, and the other member having a plurality of longitudinally extending spaced arms adapted to rotate in a path lying within and close to the arm of the first mentioned member, means for rotating the outer member, and means for rotating the inner member independently of and at a greater speed than the outer member.

In witness whereof I have signed this specification.

JOSEPH WILLIAM OWEN.